United States Patent [19]
Weiler

[11] 3,945,740
[45] Mar. 23, 1976

[54] MEANS FOR DETACHABLY SECURING A PLURALITY OF SUPPORTING LEGS TO A HORIZONTAL MEMBER TO SUPPORT SAME

[76] Inventor: Raywood C. Weiler, 17586 Vine St., Fontana, Calif. 92335

[22] Filed: Feb. 13, 1975

[21] Appl. No.: 549,534

[52] U.S. Cl. .............................. 403/217; 403/172
[51] Int. Cl.² ........................................ A47B 13/00
[58] Field of Search ........... 403/217, 219, 172, 176; 248/188

[56] References Cited
UNITED STATES PATENTS

| 396,918 | 1/1889 | Butler | 248/188 |
|---|---|---|---|
| 766,695 | 8/1904 | Herzog | 248/188 |
| 1,525,630 | 2/1925 | Wendl | 248/188 |

FOREIGN PATENTS OR APPLICATIONS

| 49,825 | 1/1941 | Netherlands | 248/188 |
|---|---|---|---|
| 413,269 | 12/1966 | Switzerland | 248/188 |

*Primary Examiner*—Andrew V. Kundrat
*Attorney, Agent, or Firm*—Max R. Kraus

[57] ABSTRACT

Means for detachably securing a plurality of supporting legs to a horizontal member, such as a table top or the like to support same, with the horizontal member having right-angled corners and with the legs positioned at the corners, the means comprising a diagonal connecting member positioned between adjacent sides of the corner and fixedly secured thereto, the diagonal connecting member supporting an adjustable member which is rotatable with respect to said diagonal connecting member. A pressure member is positioned between the adjustable member and the leg so that when the adjustable member is rotated inwardly in the direction of the leg, the pressure member applies pressure against the sides of the leg, opposite the sides positioned at the adjacent corner of same so that a uniform pressure is applied against all sides of the leg to detachably secure same.

7 Claims, 12 Drawing Figures

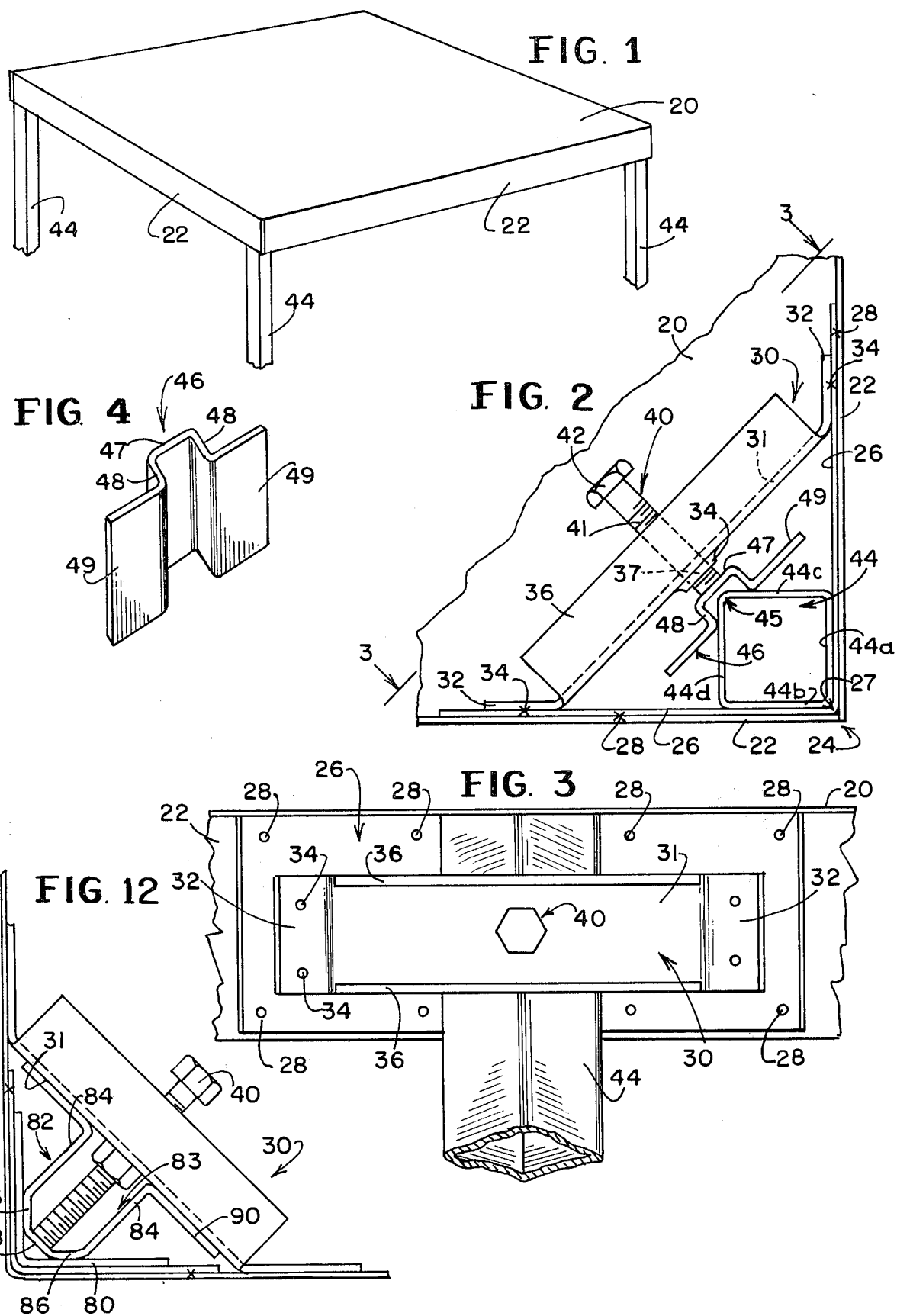

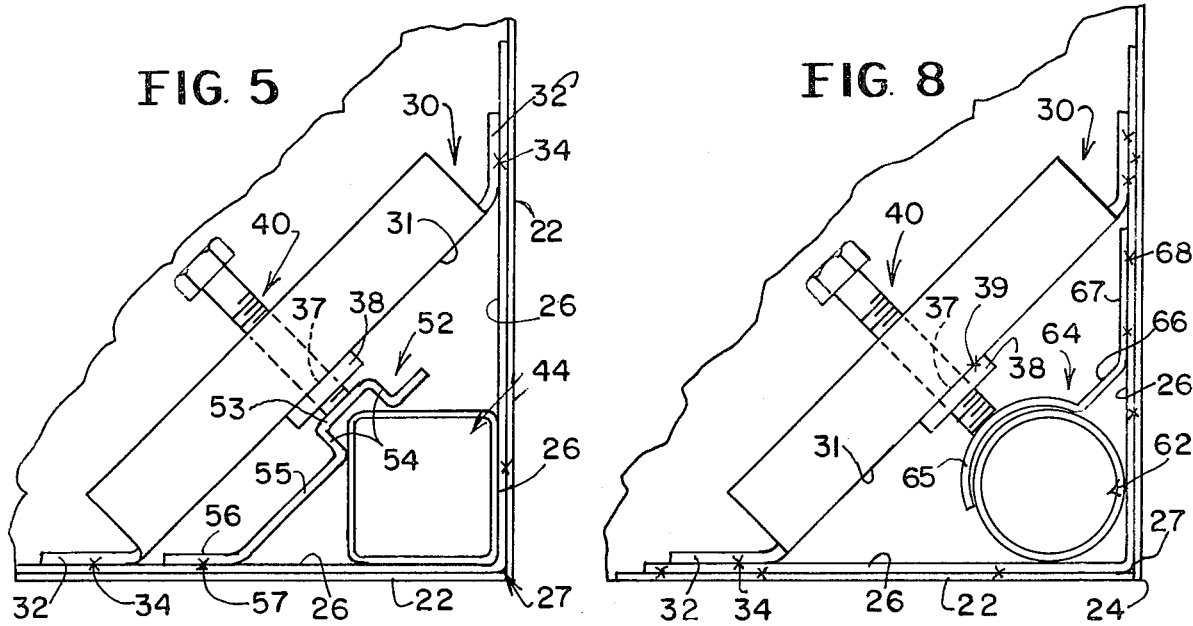
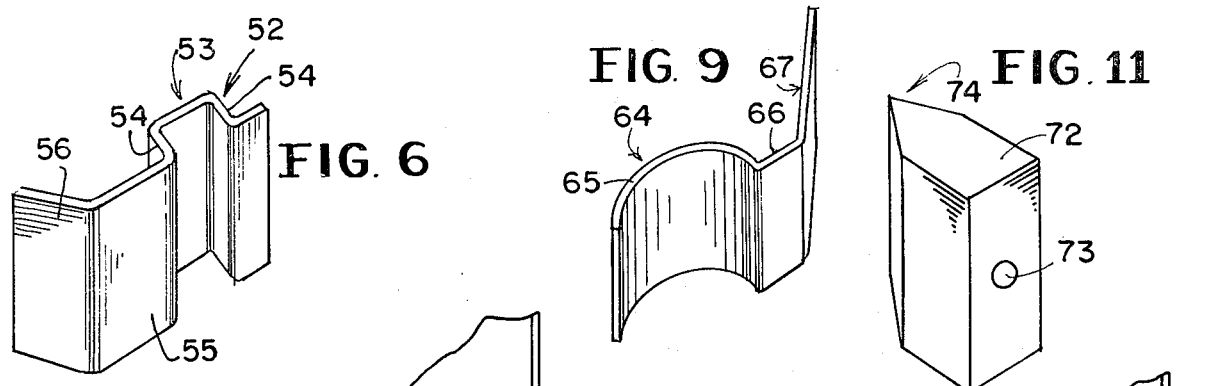
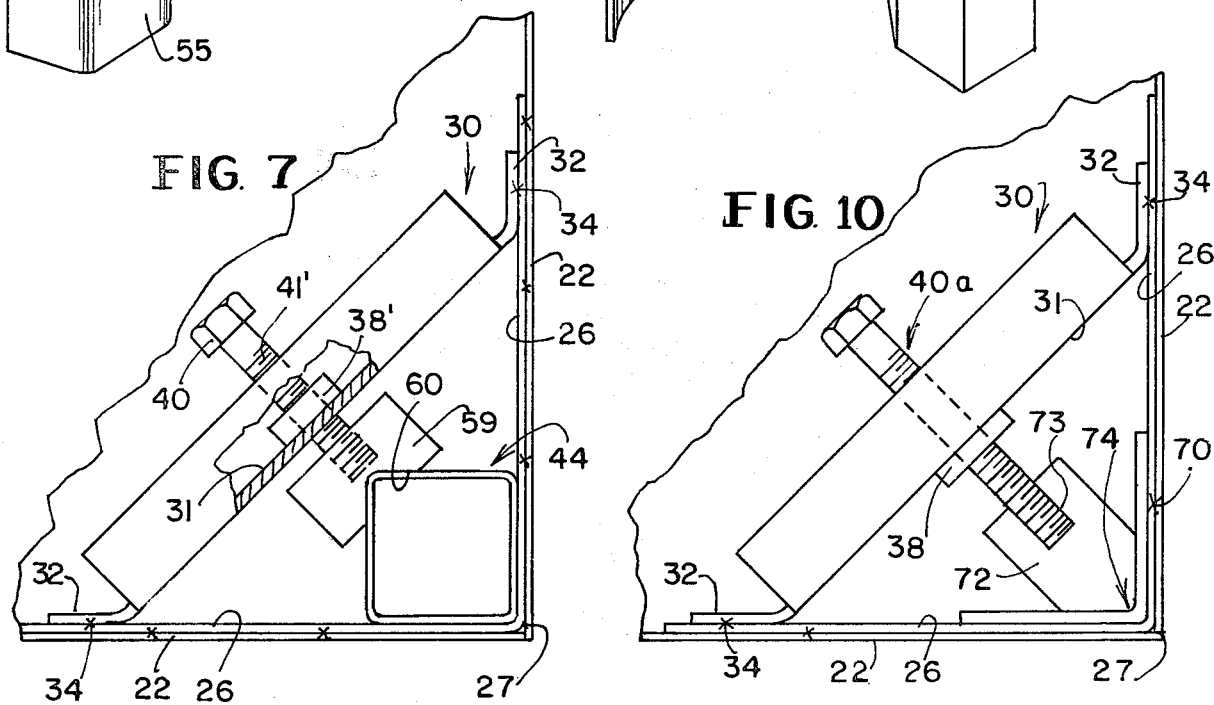

3,945,740

MEANS FOR DETACHABLY SECURING A PLURALITY OF SUPPORTING LEGS TO A HORIZONTAL MEMBER TO SUPPORT SAME

BRIEF SUMMARY OF THE INVENTION

One of the objects of this invention is to provide means for detachably securing legs to the underside of a horizontal member such as a table top or the like, at the corners thereof, whereby a pressure member applies pressure against the leg, opposite to that portion of the leg which rests against the adjacent corner of the horizontal member or the reinforcement plate thereof.

Another object of this invention is to provide means for detachably securing a plurality of supporting legs to a horizontal member such as a table top or the like, which horizontal member has depending side walls forming a corner at each of the adjacent sides and in which a leg is positioned against each said corner, and in which pressure is applied against the opposite portion of the leg so that equal pressure is uniformly applied to cause the leg to be secured to the corner portion and to retain the leg in said position. The pressure may be released to permit removal and detachment of the leg with respect to the horizontal member so that the legs may be packed and shipped in a collapsed condition with the horizontal member to occupy a minimum space.

Another object of this invention is to provide a generally square-shaped leg positioned against the corner of a horizontal member whereby the two adjacent sides of said leg are positioned against the corner and the pressure member applies pressure against the two opposite sides so that pressure is applied against the four sides of the square-shaped leg.

Another object of this invention is to provide means for applying pressure against an annular leg positioned against the corner to retain same in secured position.

BRIEF DESCRIPTION OF THE DRAWINGS

In the drawings:

FIG. 1 shows a table top having the means for detachably securing the legs thereto.

FIG. 2 is a view taken from the underside of the table top adjacent one of the corners thereof and showing one embodiment of this invention.

FIG. 3 is an elevational view taken on line 3-3 of FIG. 2.

FIG. 4 is a view of the clamping or pressure plate shown in FIG. 2.

FIG. 5 is a view taken on the underside of a table structure and showing a modification.

FIG. 6 is a perspective view of a modified clamping or pressure plate used in connection with the structure shown in FIG. 5.

FIG. 7 is a view of another modification.

FIG. 8 is a view of another modification for supporting a tubular leg.

FIG. 9 is a perspective view showing the clamping or pressure plate shown in FIG. 8.

FIG. 10 is a view of another modification for supporting a leg which is formed of a right-angled bar.

FIG. 11 is a view of the pressure member shown in FIG. 10; and

FIG. 12 is another modification for detachably supporting a leg which is formed of a right-angled bar.

FIGS. 1 through 4

The means herein shown are illustrated in connection with a table top, although it will be understood that the same means may be used to detachably support a leg in connection with any other structure.

Referring specifically to FIGS. 1 through 4, the horizontal member, therein shown as a table top and generally indicated at 20, includes four depending sides all generally indicated at 22 which form four right-angled corners all generally indicated at 24. One of such corners 24 is best shown in FIG. 2, and it will be understood that the other corners of the horizontal member have the identical means shown in FIG. 2 for supporting each of the legs. The horizontal member or table top 20 and the depending sides 22 are made preferably of metal or steel although not limited thereto. Positioned against the inside adjacent the side walls of each of said corners is a right-angled corner reinforcing plate generally indicated at 26 made of metal or steel, having a right-angled corner 27 corresponding to corner 24. The plate 26 is welded or brazed as at 28 to the inside sides 22 of the horizontal member 20.

Extending diagonally between the adjacent sides 22 and adjacent sides of the reinforcing plate 26 is a diagonal connecting member generally indicated at 30 formed of metal or steel. Said diagonal connection member 30 has a vertical wall 31 with the opposite ends of said wall bent to form opposite ends 32, which ends are brazed or welded thereto as at 34. The vertical wall 31 is turned inwardly along the upper and lower portions to form inwardly facing flanges 36 at the top and bottom thereof to provide additional ridigity for the diagonal connecting member 30. The vertical wall 31 of the diagonal connecting member 30 is drift punched to provide a centrally positioned sleeve 34 which is internally threaded as at 37 to threadedly receive the externally threaded bolt 40, which threaded bolt is sometimes hereinafter referred to as the adjustable member. In lieu of punching a threaded sleeve 34, as described, a threaded nut can be welded or brazed to the wall and alined with an opening in the wall for receiving the threaded bolt 40 for accomplishing the same purpose. This modification is described in connection with some of the subsequent modifications. The threaded bolt has the conventional threaded shank 41 and head 42. The vertical wall 31 of the diagonal connecting member 30 is at an angle of 45 degrees with respect to the adjacent sides of the corner and extends diagonally across the corner and inwardly of the corner.

The tubular leg generally indicated at 44 which is square-shaped in cross-section is positioned in the corner 27 against the adjacent sides of the reinforcing plate 26, as best seen in FIG. 2, with two of the sides 44a and 44b of the leg 44 abutting against the two adjacent sides of the corner 27 of the right-angled plate 26. A clamp or pressure plate generally indicated at 46, best shown in FIG. 4, which is made of metal or steel is diagonally positioned to engage against two of the other sides 44c and 44d of the leg 44 at the corner thereof. Said clamp or pressure plate 46 has a central generally U-shaped configuration which comprises a rear wall 47, two spaced forwardly extending side walls 48 which continue and are turned outwardly to form outwardly turned flanges 49. The clamp or pressure plate 46 is positioned so that the spaced sides 48 thereof engage the adjacent sides 44c and 44d of the leg 44, as best shown in FIG. 2.

When the adjustable member or threaded bolt 40 is rotated inwardly, the end of the adjustable member bears against the back wall 47 of the diagonally positioned clamp or pressure plate 46 and applies a pressure against said clamping or pressure plate so that the said plate applies pressure against the sides 44c and 44d, which are opposite the sides 44a and 44b of the leg to secure the leg to the table top. When pressure is applied by the bolt 40 against the back wall 47 of the clamp or pressure plate 46, the metal pressure plate 46 "gives" sufficiently to permit the back wall 47 thereof to touch the corner 45 of the square-shaped tubular leg 44 and thereby also apply a pressure against the innermost corner 45 of the leg. Thus, the square-shaped leg 44 has pressure applied against it at the sides 44a and 44b adjoining the right-angled plate 26 and also against the other sides 44c and 44d, and against the corner 45 by means of the pressure plate 46. The "give" of the pressure plate 46 loses no holding power but rather increases the holding power against the leg. The leg may be readily inserted on the underside of the table top and secured in the manner described. The top of the leg 44 rests against the underside of the horizontal member 20.

It will be understood that to detach the leg the adjustable member or threaded bolt 40 is rotated in the opposite direction so that it moves away from the leg and allows the clamp or pressure plate 46 to be removed from against the leg to permit the leg to be removed.

If it is desired to secure the clamp or pressure plate 46 to the end of the threaded bolt 40, this may be readily done by providing an opening in the back wall 47 of the clamping or pressure plate and securing the end of the threaded bolt in said opening in a manner so that the threaded bolt may be rotated relative to the pressure plate without detachment of the pressure plate therefrom.

FIGS. 5 and 6

The modification shown in FIGS. 5 and 6 differs from the structure previously described with respect to the pressure or clamping plate and to the use of a threaded nut for receiving the threaded bolt 40. In all other respects the structure previously described remains the same and will be identified by the same numerals without being redescribed. In this modification the pressure or clamping plate, generally indicated at 52, has a U-shaped portion 53 which has spaced sides 54 which engage the square-shaped tubular leg, in the same manner as previously described. The pressure plate 52 has an extension 55 extending from one of the sides, with an end 56 which is turned inwardly at right angles thereto. The end 56 is welded or brazed as at 57 to the side of the right-angled reinforcing plate 26. The vertical wall 31 of the diagonally connecting member 30 has a central opening 37 which is alined with an internally threaded nut 38 which is brazed or welded as at 39 to the vertical wall for threadedly receiving the threaded bolt 40, in much the same manner as the threaded sleeve 34 previously described. When the threaded bolt 40 is threaded inwardly in the direction of the clamping plate 52 it will bear against the plate and the extension 55 at the bend will flex inwardly and apply pressure against the leg. In this construction the pressure plate 52 is secured to the inside right-angled reinforcement member and thus is permanently affixed to the underside of the table.

FIG. 7

FIG. 7 is another modification in which the threaded nut 38' is secured against the inside facing vertical wall 31 of the diagonal connecting member 30. The threaded shank 41' of the adjustable member 40 supports a pressure member 59 in the form of a block having a centrally positioned V-shaped cutout 60. The V-shaped cutout of the pressure block engages the corner of the leg, as shown in said Figure and thus the pressure is uniformly applied to all sides of the square-shaped leg, similar to that previously described.

FIGS. 8 and 9

FIGS. 8 and 9 show a modification which serves to detachably support a tubular leg 62. The tubular leg is positioned adjacent the corner 27 of the reinforcement plate 26. A pressure or clamping plate generally indicated at 64 consists of an arcuate-shaped portion 65, an extension 66 and a flange or wall 67. The flange or wall 67 is welded or brazed as at 68 to the inside wall of the right-angled member or reinforcement plate 26, as shown in FIG. 8. The arcuate-shaped portion 65 is adjacent to the tubular leg and extends around a portion of same. When the adjustable threaded member 40 is rotated to move inwardly against the arcuate-shaped member, pressure is applied against the arcuate-shaped member, which in turn bears against the correspondingly shaped portion of the tubular leg 62 to hold same to the underside of the table top. It will be noted with respect to the tubular leg that the leg engages the two adjacent walls adjacent the corner 27 and the pressure plate 65 engages against the other or opposite portion of the leg to apply equal pressure, in the same manner as would be applied against the square-shaped leg.

FIGS. 10 and 11

FIGS. 10 and 11 show another modification in which the leg generally indicated at 70 consists of a right-angled bar having walls abut against the right-angled corner reinforcement member 26. The adjustable member or threaded bolt 40a carries a pressure member generally indicated at 72 in the form of a block and said block is internally drilled as at 73 to receive the threaded end of the bolt 40a. The forward end of the pressure block has a pointed front or right-angled corner 74 which engages the adjacent sides of the right-angled reinforcement plate 26. In this instance the pressure is equally applied against the outer and inner sides of the leg.

FIG. 12

FIG. 12 is a modification which serves to hold a right-angled leg 80, similar to that shown in FIG. 10. In this modification all of the parts are similar to that previously described except that the pressure member generally indicated at 82 is in the form of a plate which has a central portion 83 which is generally U-shaped having spaced parallel sides 84 with inwardly inclined forward portions 86 connected by an end 88. The inner end of the pressure member has outwardly extending flanges 90 which abut against the vertical wall 31 of the diagonal connecting member 30. The inwardly inclined forward portions 86 are parallel to the sides of the right-angled leg 80 and engage same. When the adjustable member 40 is rotated it bears against the end 88 and pressure is applied against the inside of the right-angled leg 80 by the inclined forward portions 86. Thus, in this construction the pressure is applied to the right-angled leg on the outside and inside parts of the leg.

In the various embodiments herein described, the right-angled reinforcing member 26 is shown. It will be understood that if the reinforcing member 26 is eliminated, the diagonal connecting member can be secured directly to the adjacent depending sides of the horizontal member or table top and when the pressure is applied against the leg, equal pressure will be applied against all sides of the leg.

What is claimed is:

1. Means for detachably securing a plurality of supporting legs which are generally square-shaped in cross section to a horizontal member to support same, said horizontal member having a plurality of downwardly depending corners, a diagonal connecting member positioned diagonally between adjacent sides of each said corner and secured to said adjacent sides, said diagonal connecting member having internally threaded means, an adjustable member supported by said diagonal connecting member, said adjustable member being externally threaded to engage said internally threaded means for adjusting said adjustable member with respect to said leg, a U-shaped member which is diagonally positioned and engaged by said adjustable member with the spaced sides of the U-shaped member engaging the innermost right-angled corner of said generally square-shaped leg and adapted to apply pressure against the leg to hold the leg in said corner between the said adjacent sides, said adjustable member when retracted permitting removal of said leg.

2. Means as set forth in claim 1 in which the downwardly depending corner of the horizontal member is formed of sides at right angles to each other to form a right-angled corner and in which two of the sides of the leg are adjacent said right-angled corner and in which the spaced sides of the U-shaped member apply equal pressure to the two opposite sides of said leg so that pressure is applied to all four sides of said square-shaped leg to retain same attached to said horizontal member.

3. Means as set forth in claim 2 in which the right-angled corner of the horizontal member has a right-angled reinforcement member secured thereto against which the leg abuts.

4. Means as set forth in claim 1 in which the leg is tubular.

5. Means as set forth in claim 1 in which the U-shaped member is secured to said adjustable member.

6. Means as set forth in claim 1 in which the sides of the U-shaped member each has an outwardly turned flange.

7. Means as set forth in claim 1 in which the downwardly depending corners are connected by downwardly depending portions and in which the U-shaped member has an extension which is secured to said downwardly extending portion.

* * * * *